(12) United States Patent
Joh et al.

(10) Patent No.: US 10,556,203 B2
(45) Date of Patent: Feb. 11, 2020

(54) METHOD AND DEVICE FOR THE DESULPHURISATION OF A GAS FLOW

(71) Applicant: Siemens Aktiengesellschaft, Munich (DE)

(72) Inventors: Ralph Joh, Seligenstadt (DE); Rüdiger Schneider, Eppstein (DE); Nicolas Vortmeyer, Erlangen (DE); Gerhard Zimmermann, Höchstadt/Aisch (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/561,732

(22) PCT Filed: Mar. 7, 2016

(86) PCT No.: PCT/EP2016/054723
§ 371 (c)(1),
(2) Date: Sep. 26, 2017

(87) PCT Pub. No.: WO2016/180555
PCT Pub. Date: Nov. 17, 2016

(65) Prior Publication Data
US 2018/0104641 A1   Apr. 19, 2018

(30) Foreign Application Priority Data

May 12, 2015   (DE) .......... 10 2015 208 791

(51) Int. Cl.
*B01D 53/14*   (2006.01)
*B01D 53/86*   (2006.01)
(Continued)

(52) U.S. Cl.
CPC ..... *B01D 53/1418* (2013.01); *B01D 53/1425* (2013.01); *B01D 53/1468* (2013.01);
(Continued)

(58) Field of Classification Search
CPC .......... B01D 2257/304; B01D 53/1418; B01D 53/1425; B01D 53/1468; B01D 53/52;
(Continued)

(56) References Cited

U.S. PATENT DOCUMENTS 4,036,942 A   7/1977   Sibeud et al.
4,693,881 A * 9/1987   Miller ................. C01B 17/05
                                                 423/558
(Continued)

FOREIGN PATENT DOCUMENTS

JP   S63297496 A      12/1988
JP   H0325541     *    3/1991   ......... B01D 53/1418
(Continued)

OTHER PUBLICATIONS

DE Search Report dated Nov. 19, 2015, for DE patent application No. 102015208791.3.
(Continued)

*Primary Examiner* — Cabrena Holecek
(74) *Attorney, Agent, or Firm* — Beusse Wolter Sanks & Maire

(57) ABSTRACT

A method and device for the desulphurisation of a hydrogen sulphide-containing gas flow, in particular for combustion in a gas turbine, wherein the gas flow is brought into contact with a washing agent containing a catalytically active component for the absorption of the hydrogen sulphide and forming elementary sulphur, wherein the catalytically active component is reduced in the formation of the elementary sulphur, wherein the washing medium containing the reduced catalytically active component is supplied to a regeneration stage, in which the reduced catalytically active component is converted back via oxidation with an oxygen-containing gas supplied to the regeneration stage, and wherein the oxygen-containing gas is supplied to the regen-
(Continued)

eration stage from a compressor of a gas turbine. Air from the compressor of a gas turbine is used for purifying a washing medium used for the desulphurisation of a gas flow.

20 Claims, 1 Drawing Sheet

(51) Int. Cl.
*B01D 53/96* (2006.01)
*B01J 38/14* (2006.01)
*F02C 3/34* (2006.01)

(52) U.S. Cl.
CPC ....... *B01D 53/8612* (2013.01); *B01D 53/965* (2013.01); *B01J 38/14* (2013.01); *F02C 3/34* (2013.01); *B01D 2257/304* (2013.01)

(58) Field of Classification Search
CPC ... B01D 53/8612; B01D 53/965; B01L 38/14; C01B 17/05; C10L 3/103; F02C 3/34; Y02P 20/133
See application file for complete search history.

(56) References Cited

U.S. PATENT DOCUMENTS

| | | |
|---|---|---|
| 4,830,838 A | 5/1989 | Kent et al. |
| 9,732,675 B2* | 8/2017 | Oelfke .................. F02C 6/003 |
| 2002/0059864 A1 | 5/2002 | Janssen et al. |
| 2007/0283812 A1 | 12/2007 | Liu et al. |
| 2015/0165368 A1* | 6/2015 | Brunhuber ......... B01D 53/1425 95/183 |
| 2016/0074804 A1 | 3/2016 | Brechtel et al. |

FOREIGN PATENT DOCUMENTS

| | | | |
|---|---|---|---|
| JP | H0325541 U | | 3/1991 |
| JP | H08266851 A | | 10/1996 |
| JP | 10235128 A | * | 9/1998 |
| JP | H10235128 A | | 9/1998 |
| JP | 2007136251 A | | 6/2007 |
| WO | 2014170047 A1 | | 10/2014 |

OTHER PUBLICATIONS

International Search Report dated Jun. 2, 2016, for PCT/EP2016/054723.
IPPR (PCT/IPEA 416 and 409) dated Jul. 10, 2017, for PCT/EP2016/054723.

* cited by examiner

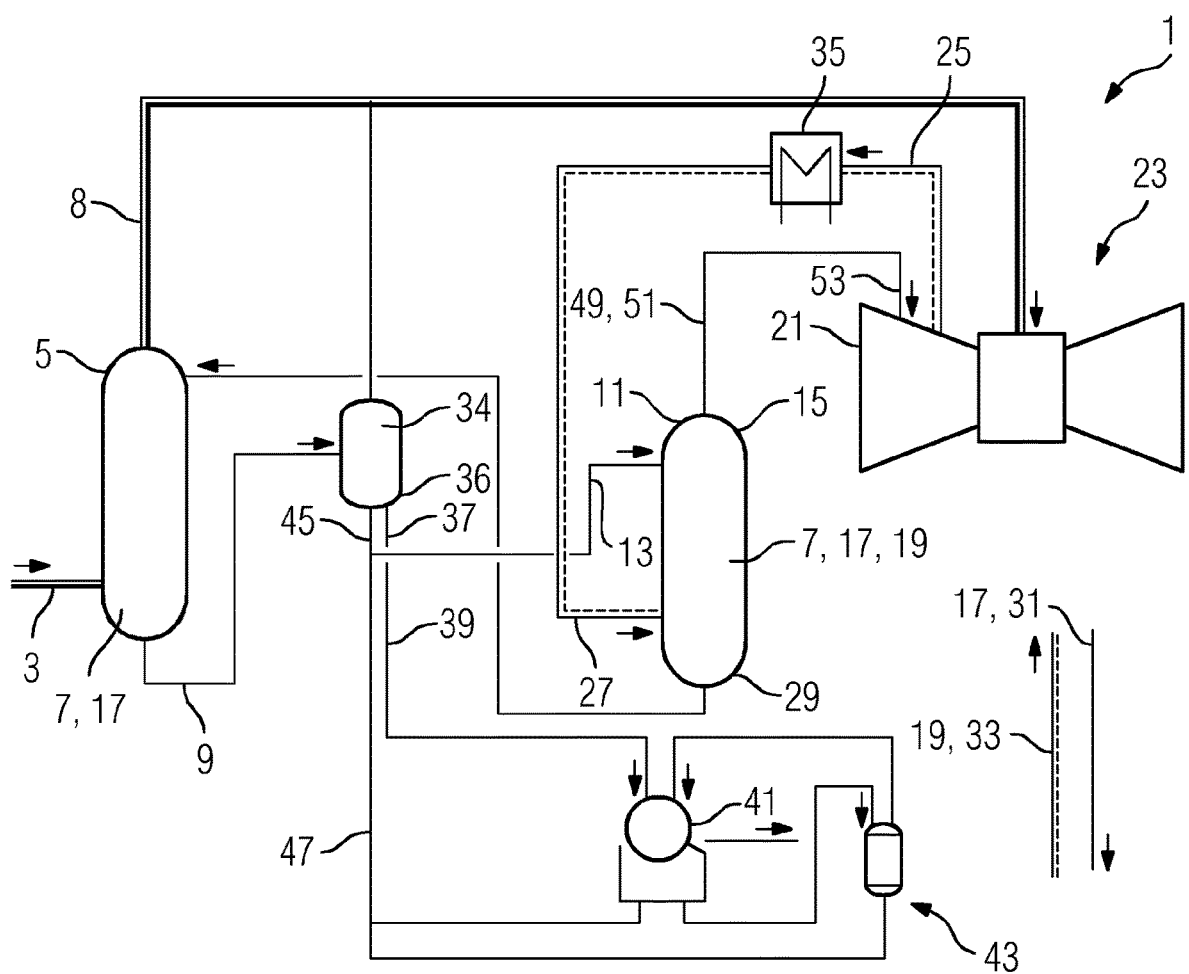

METHOD AND DEVICE FOR THE DESULPHURISATION OF A GAS FLOW

CROSS REFERENCE TO RELATED APPLICATIONS

This application is the US National Stage of International Application No. PCT/EP2016/054723 filed Mar. 7, 2016, and claims the benefit thereof. The International Application claims the benefit of German Application No. DE 102015208791.3 filed May 12, 2015. All of the applications are incorporated by reference herein in their entirety.

FIELD OF INVENTION

The invention relates to a method for desulfurizing a hydrogen-sulfide-comprising gas stream, in particular a gas stream utilizable for burning in a gas turbine. The invention further relates to an apparatus for desulfurizing a gas stream.

BACKGROUND OF INVENTION

Natural gas is a fossil fuel having comparatively low emissions of carbon dioxide ($CO_2$) and comparatively low emissions of other waste products during burning. Its contribution as one of the most important energy resources in the world continues to increase. Against a background of raw material depletion, constantly increasing energy requirements and for reasons of environmental protection the treatment and utilization of natural gas thus represent a very promising possibility for efficient and low emission energy generation.

Accordingly the use of natural gas as fuel gas in gas turbines is also desirable in order thus to be able to generate electrical and mechanical energy in simple and cost-effective fashion. However, direct utilization of raw natural gas has hitherto been possible only to a limited extent on account of acidic constituents, such as in particular hydrogen sulfide ($H_2S$). The trouble-free and energy-efficient operation of gas turbines requires limitation of the sulfur content in the fuel gas to avoid or at least reduce high temperature corrosion and also to comply with the globally tightened emissions limits concerning sulfur oxides ($SO_X$). Hydrogen-sulfide-comprising fuel gases, and in particular acidic natural gases, must therefore be subjected to appropriate treatment.

For the separation of hydrogen sulfide from gases various separation techniques are known where physical or chemical absorption media, also known as scrubbing media, are employed to ensure the purities required for a further use of the particular gas. In addition to the classical absorption-desorption methods with subsequent $H_2S$ conversion, for example by means of a Claus process, so-called liquid-redox methods are employed in particular for smaller capacities.

These liquid-redox methods are based on the concept of the reactive absorption, i.e. a combination of absorption and oxidation. To separate the hydrogen sulfide from the particular gases the gas is brought into contact with a scrubbing medium and the hydrogen sulfide present in the gas is chemically or physically bonded to an active substance of the scrubbing medium. The fuel gas purified of hydrogen sulfide may then be burned in a gas turbine.

Treatment of the scrubbing medium comprising the hydrogen sulfide is effected subsequently via a redox agent which converts hydrogen sulfide present in the scrubbing medium into elemental sulfur and thus separates the hydrogen sulfide from the scrubbing medium. The redox agent is reduced by the hydrogen sulphide. By contacting with an oxygen-comprising gas the redox agent is reoxidized and accordingly regenerated. The feeding of oxygen-comprising gas is effected for example via blowers provided especially therefor or by gassing with externally supplied, precompressed oxygen-comprising air.

SUMMARY OF INVENTION

A first problem addressed by the invention is that of providing a method by means of which, compared to commonly used methods, desulfurizing of a fuel gas may be performed more efficiently and more cost-effectively.

A second problem addressed by the invention is that of specifying an apparatus by means of which a corresponding method is performable economically.

The first problem addressed by the invention is solved in accordance with the invention by a method for desulfurizing a hydrogen-sulfide-comprising gas stream, in particular a gas stream utilizable for burning in a gas turbine, wherein the gas stream is contacted with a scrubbing medium comprising a catalytically active component to absorb the hydrogen sulfide and to form elemental sulfur, wherein the catalytically active component is reduced during formation of the elemental sulfur, wherein the scrubbing medium comprising the reduced catalytically active component is supplied to a regeneration stage in which the reduced catalytically active component is reformed by oxidation with an oxygen-comprising gas supplied to the regeneration stage and wherein the oxygen-comprising gas is supplied to the regeneration stage from a compressor of a gas turbine.

The invention proceeds from the realization that a highest possible energetic and economic efficiency necessitates optimization of the entire plant consisting of a gas treatment and a gas turbine correspondingly employed to burn the treated gas. However, acidic gas treatment and gas turbine operation have hitherto constituted two processes implemented independently of one another. Thus the need for oxidation air for the liquid-redox process has hitherto been met in complex and costly fashion by separate blowers and corresponding compressors.

The invention further takes account of the fact that in the context of IGCC (integrated gasification combined cycle) power plants utilization of waste air from the compressor of a gas turbine is possible. Here, the air withdrawn from the compressor is supplied to a further use, such as a gasifier for example, and thus utilized in a targeted manner.

The invention now transfers this knowledge to the process of desulfurizing a gas stream and recognizes that it is likewise possible to utilize the air withdrawable from a gas turbine process/a compressor of a gas turbine in the context of desulfurizing a gas stream. The air provided by the compressor comprises oxygen which is utilizable for regenerating the catalytically active component the in the context of the gas treatment/liquid-redox process. The oxygen-comprising gas for regenerating the catalytically active components is accordingly supplied to the regeneration stage from a compressor of a gas turbine.

The oxygen-comprising gas is in particular withdrawn from the compressor at a pressure level which allows direct utilization in the regeneration stage. Compression or decompression of the oxygen-comprising gas before entry into the regeneration stage is thus not necessary. The pressure of the withdrawn air is determined by the mechanical engineering design of the compressor and the optimized pressure level of the regeneration stage.

In other words what is concerned is a coupling/a combination of the desulfurizing process of a gas stream with the gas turbine process by which the air throughput required for regenerating the catalytically active component is achieved without an additional energy input into the process. This combination particularly has a favorable effect on the energy efficiency and thus on the economy of the overall process. The energy efficiency of the regeneration process is markedly improved compared to commonly used processes since compressors of gas turbines operate at high energy efficiencies. Furthermore costs are reduced since no separate air compressor for the gas treatment is required.

In particular the increased oxygen partial pressure of the supplied oxygen-comprising gas results in an improved mass transfer and thus in a more efficient regeneration of the catalytically active component inside the regeneration stage, thus ultimately making it possible to reduce the amount of air necessary for converting hydrogen sulfide.

More degrees of freedom for optimizing the pressure level in the context of the gas treatment also arise. The separation of the elemental sulfur from the scrubbing medium advantageously follows a preceding degassing in a pressure vessel/flash vessel appropriately implemented therefor. This allows undesirable formation of foams in the stream/corresponding suspension withdrawn for sulfur separation to be avoided.

The regeneration stage employed is for example a bubble column which provides the mass transfer area necessary for the reaction of the catalytically active component with oxygen. The scrubbing medium is advantageously supplied to the regeneration stage at the top thereof. Supply is advantageously effected from an absorber in which the hydrogen sulfide to be separated was absorbed in the scrubbing medium.

In addition to the catalytically active component the scrubbing medium exiting the absorber also comprises the elemental sulfur formed. Said sulfur is advantageously separated from the scrubbing medium before entry thereof into the regeneration stage. In an advantageous embodiment separation is effected in a pressure vessel connected downstream of the absorber. From this pressure vessel the scrubbing medium comprising the reduced catalytically active components, i.e. the spent catalyst, is then supplied to the regeneration stage.

Here, the scrubbing medium is passed to the top of the regeneration stage either on account of the pressure prevailing in the absorber or using a pump. The scrubbing medium then flows from the top downward through the regeneration stage, i.e. in the direction of the bottom of the regeneration stage. The scrubbing medium employed is advantageously a scrubbing medium comprising an amino acid salt as the scrubbing-active substance.

The oxygen-comprising gas is advantageously supplied to the regeneration stage at the bottom thereof and thus flows through the regeneration stage in a flow direction counter to the flow direction of the scrubbing medium.

The reaction of the hydrogen sulfide present in the scrubbing medium to afford elemental sulfur proceeds via the formation of sulfides inside the absorber using the catalytically active component. Here, inside the absorber, by contact of the hydrogen sulfide with the scrubbing medium, sulfides are formed which then react to form elemental sulfur via reduction of the catalytically active component present in the scrubbing medium.

It is possible in principle that the catalytically active component is not only present in the scrubbing medium and circulates together therewith but rather that the catalytically active component is additionally also present inside the regeneration stage. Solids particles, for example, are conceivable in the regeneration stage.

It is advantageous when a metal salt is employed as the catalytically active component. Metal salts having metal ions which may be present in a plurality of oxidation states are suitable in principle here. It is advantageous to employ the salts of the metals iron, manganese or copper. These metal salts are cost-effective to obtain and exhibit the desired catalytic properties.

To improve the solubility of the respective metal salt(s) it is advantageous when a scrubbing medium is employed which has a complex former added to it. The complex former prevents precipitation of the metal ions as metal sulfides (MeS). All complex formers capable of keeping the metal ions in solution are suitable in principle. It is advantageous to employ EDTA (ethylenediamine tetraacetate), HEDTA (hydroxyethylethylenediamine tetraacetate), DTPA (diethylenetriamine pentaacetate) and/or NTA (nitrile triacetate).

The oxidation of the hydrogen sulfide to form elemental sulfur is in principle effected via reduction of the metal ion. By way of example in a scrubbing medium which comprises as the catalytically active component relatively complex iron(III) ions, reaction of the Fe(III) ions in solution with the hydrogen sulfide ($H_2S$) forms elemental sulfur (S) and Fe(II) ions. The Fe(III) ions are thus reduced by the reaction with hydrogen sulfide, the hydrogen sulfide being oxidized to afford sulfur.

The sulfur precipitates out as a solid and the Fe(II) ions remain in solution. To keep the Fe(II) ions in solution and prevent the formation of iron sulfide (FeS) the scrubbing medium has a complex former added to it as described above and the Fe(II) ions are therefore present in the scrubbing medium in a masked state in the form of chelate complexes.

The reforming of the catalytically active component is effected by oxidation with oxygen-comprising gas withdrawn from the compressor of the gas turbine and influxing into the regeneration stage. During contact of the scrubbing medium with the oxygen-comprising gas the oxygen present in the gas is transferred from the gas phase into the liquid phase, i.e. into the scrubbing medium. The oxidation of the metal ion previously reduced during sulfur formation is effected in the liquid phase—for example Fe(II) ions to Fe(III) ions as described above—so that said ions are once again available for separation of hydrogen sulfide as elemental sulfur by oxidation.

To ensure the most complete possible regeneration of the catalytically active component an excess—based on the amount of the catalytically active component to be oxidized—of oxygen is advantageously metered into the regeneration stage. The amount of the oxygen-comprising gas supplied to the regeneration stage is advantageously metered such that the ratio of the supplied amount of oxygen to the amount of the catalytically active component is >1. Having regard to the metered amount of oxygen a superstoichiometric reaction, where an excess of oxygen is present, is thus concerned.

In a further advantageous embodiment of the invention the oxygen-comprising gas is cooled before entry into the regeneration stage. The heat liberated during cooling of the oxygen-comprising gas is advantageously further utilized. It is particularly advantageous when the heat liberated during cooling of the oxygen-comprising gas is supplied to a treatment apparatus for treatment of the employed scrubbing medium. Alternatively or in addition the invention provides for feeding the liberated heat into a desulfurizing process.

In a particularly advantageous embodiment waste air formed during regeneration of the catalytically active component is recycled into the compressor of the gas turbine. The waste air is the waste air stream which is depleted of oxygen reacted during oxidation of the catalytically active component and may also comprise small fractions of entrained scrubbing medium and further degassing products.

When the waste air from the regeneration stage passes through the burning process of the gas turbine undesired emissions are reduced. The waste air stream is advantageously withdrawn from the regeneration stage at the top thereof. A cooling of the waste air stream optionally by means of a heat exchanger may be implemented here. In an alternative embodiment the waste air stream is blown off.

The regenerated scrubbing medium is advantageously withdrawn at the bottom of the regeneration stage. The scrubbing medium here comprises the regenerated catalytic component and advantageously up to 5 wt % of solids, i.e. of sulfur. The stream diverted for filtration may be extremely small yet still discharge the necessary amount of sulfur formed. The regenerated scrubbing medium is advantageously passed from the regeneration stage into an absorber. There it is once again utilized for absorbing hydrogen sulfide, in particular from an acidic natural gas.

The scrubbing medium comprising the reduced catalytically active component is advantageously supplied to a pressure vessel, a so-called flash vessel, before feeding to the regeneration stage. The pressure vessel is advantageously fluidically interposed between the absorber and the regeneration stage. The scrubbing medium is degassed inside the pressure vessel.

It is advantageous when a stream of the degassed scrubbing medium which comprises elemental sulfur is withdrawn from the pressure vessel and supplied to a separation unit fluidically connected to the pressure vessel. In the separation unit the sulfur present in the scrubbing medium is separated therefrom. As the separation unit—as part of a treatment apparatus for the scrubbing medium—a filtration unit or a cyclone for example may be employed. The scrubbing medium purified of the solid is supplied to the regeneration stage again.

The second problem addressed by the invention is solved in accordance with the invention by an apparatus for desulfurizing a hydrogen sulfide-comprising gas stream, in particular a fuel gas stream utilizable for burning in a gas turbine, comprising an absorber for absorbing hydrogen sulfide from the gas stream to form elemental sulfur by means of a scrubbing medium comprising a catalytically active component and a regeneration stage for regenerating the catalytically active component reduced during sulfur formation which is fluidically connected to the absorber, wherein the regeneration stage comprises an input air feed for feeding the oxygen-comprising gas which is fluidically connected to a discharge conduit of a compressor of a gas turbine.

Due to the fluidic connection of the discharge conduit of the compressor of the gas turbine to the input air feed of the regeneration stage, air withdrawn from the compressor of the gas turbine flows into the regeneration stage and thus provides the required oxygen flow for desulfurizing a gas stream. Such an apparatus allows a simple, cost-effective and economically efficient processual combination of gas desulfurizing and gas turbine operation.

After separation of the elemental sulfur from the scrubbing medium the scrubbing medium comprising the spent catalytically active components is supplied from the absorber to the regeneration stage via the fluidic connection of the regeneration stage with the absorber. The absorber is advantageously coupled via a discharge conduit to a feed conduit of the regeneration stage. The feed conduit of the regeneration stage for metering the scrubbing medium is advantageously connected to the top thereof.

For feeding the oxygen-comprising gas the input air feed of the regeneration stage is advantageously connected to the bottom thereof. The input air feed may for example be implemented in the form of one or more openings in the regeneration stage and allows air feeding of the oxygen flow required for regenerating the catalytically active component.

It is advantageous when the catalytically active component employed for converting the hydrogen sulfide absorbed in the scrubbing medium into elemental sulfur is a metal salt.

The employed scrubbing medium itself is advantageously an aqueous amino acid salt solution. The catalytically active component has advantageously been admixed with the scrubbing medium. The scrubbing medium is advantageously likewise a complex former for masking the metal ions before.

The ratio of the amount of oxygen supplied to the regeneration stage for reforming the catalytically active component to the amount of catalytically active component is advantageously >1. This ensures complete regeneration of the catalytically active component.

The input air feed is advantageously implemented as a feed conduit comprising a heat exchanger. The feed conduit is advantageously connected to the regeneration stage and advantageously fluidically connected to the discharge conduit of the compressor of the gas turbine.

The oxygen-comprising gas withdrawn from the compressor is cooled by means of the heat exchanger. The thus liberated heat is advantageously otherwise utilized. To this end the heat exchanger is advantageously thermally coupled to a treatment apparatus for the scrubbing medium. Alternatively or in addition the heat liberated may be coupled into a desulfurizing process.

It is particularly advantageous when a waste air conduit fluidically connected to the compressor of the gas turbine is connected to the regeneration stage. Via the waste air conduit waste air formed during the regeneration of the catalytically active component is recycled into the compressor of the gas turbine. The waste air conduit is advantageously connected to the top of the regeneration stage. For supplying waste air to the compressor of the gas turbine the waste air conduit is advantageously fluidically connected to a feed conduit of the compressor of the gas turbine.

In a further advantageous embodiment a discharge conduit for regenerated scrubbing medium is connected to the regeneration stage. Regenerated scrubbing medium is to be understood as meaning scrubbing medium which contains the catalytically active component regenerated in the regeneration stage. It is advantageous when the regeneration stage is fluidically connected to the absorber via the discharge conduit. The regenerated scrubbing medium is thus supplied to the absorber again. To this end the discharge conduit of the regeneration stage is advantageously coupled to a feed conduit of the absorber. The scrubbing medium is accordingly recirculated.

The advantages recited for preferred embodiments of the method apply analogously to corresponding embodiments of the apparatus.

BRIEF DESCRIPTION OF THE DRAWINGS

An embodiment of the invention is hereinbelow more particularly elucidated with reference to a drawing.

FIG. 1 shows an apparatus for desulfurizing a gas stream.

DETAILED DESCRIPTION OF INVENTION

FIG. 1 shows an apparatus 1 for desulfurizing a gas stream 3, in particular a fuel gas stream for a gas turbine. The gas stream 3 is brought into contact inside an absorber 5 with an aqueous amino acid salt solution as scrubbing medium 7. Inside the absorber 5 hydrogen sulfide present in the gas stream 3 is absorbed in the scrubbing medium 7. The gas purified of hydrogen sulfide is withdrawn from the absorber 5 via a discharge conduit 8 and supplied to a burning in a gas turbine process.

Via a further discharge conduit 9 connected to the absorber 5 the scrubbing medium 7 is supplied to a regeneration stage 11. To this end, the discharge conduit 9 connected to the absorber 5 is fluidically connected to a feed conduit 13 of the regeneration stage 11. The feed conduit 13 is connected to the top 15 of the regeneration stage 11.

The scrubbing medium 7 employed in the absorber 5 comprises a catalytically active component 17. During absorption of the hydrogen sulfide inside the scrubbing medium 7 sulfides are formed which on account of the presence of the catalytically active component 17 already react to afford elemental sulfur in the absorber 5. The catalytically active component 17, complexed iron(III) ions in the present case, is thus reduced. The sulfur precipitates out as solid, the Fe(II) ions formed by the reduction remain in solution and are masked by the EDTA complex former added to the scrubbing medium. The scrubbing medium 7 comprising the spent catalytically active component 17 and the elemental sulfur is thus discharged from the absorber 5 via the discharge conduit 9.

To reform the catalytically active component 17 and be able to use it again as catalyst the scrubbing medium 7 comprising the elemental sulfur and the Fe(II) ions is supplied to the regeneration stage 11. An oxygen-comprising gas 19 withdrawn from a compressor 21 of a gas turbine 23 is metered into the regeneration stage 11.

The feeding of the oxygen-comprising gas 19 is effected via the connection of a discharge conduit 25 of the compressor 21 to an input air feed 27 of the regeneration stage 11 which is implemented as a feed conduit. The input air feed 27 is implemented at the bottom 29 of the regeneration stage 11. Through this fluidic connection of the discharge conduit 25 of the compressor 21 of the gas turbine 23 to the feed conduit 27 of the regeneration stage 11, air 19 withdrawn from the compressor 21 may flow into the regeneration stage 11 and thus provide the oxygen flow required for oxidation of the catalytically active components 17.

The oxygen-comprising gas 19, i.e. the air withdrawn from the gas turbine 23 influxes in a flow direction 33 counter to the flow direction 31 of the scrubbing medium 7 via the feed conduit 27 from the bottom 29 of the regeneration stage 11 into said stage. Arranged in the feed conduit 27 is a heat exchanger 35 which cools the gas 19 before entry into the regeneration stage 11. The heat thus formed may be utilized in a treatment process for the scrubbing medium 7 for example.

The reforming of the catalytically active component 17 is effected by the contact of the scrubbing medium 7 with the oxygen-comprising gas 19. This transfers the oxygen present in the gas 19 from the gas phase into the liquid phase, i.e. into the scrubbing medium 7. The oxidation to Fe(III) ions of the Fe(II) ions previously reduced during sulfur formation is effected in the liquid phase. The Fe(III) ions are once again available for separation of hydrogen sulfide present in the scrubbing medium 7.

Before entry into the regeneration stage 11 the scrubbing medium 7 is supplied to a pressure vessel 34. The pressure vessel 34 serves to degas the scrubbing medium 7 before regeneration. The pressure vessel 34 is fluidically interposed between the absorber 5 and the regeneration stage 19 and provides the pressure level necessary for separation of the elemental sulfur from the scrubbing medium 7.

Via a withdrawal conduit 37 connected to the bottom 36 of the pressure vessel 34 elemental sulfur together with a portion of the scrubbing medium 7 in the form of a suspension 39 is withdrawn and supplied to a separation unit 41. The amount of sulfur discharged from the process is the amount formed per unit time in the absorber 5. Inside the separation unit 41, implemented as a filtration unit in the present case, the sulfur is completely separated from the scrubbing medium 7 and removed from the process. The remaining scrubbing medium 7 is supplied to a treatment apparatus 43 and there subjected to final purification.

From the pressure vessel 34, likewise at the bottom 36 thereof, the scrubbing medium 7 that has been degassed and purified of sulfur by withdrawal of the suspension 39 is withdrawn via a further withdrawal conduit 45 and passed on into the regeneration stage 19. To this end the withdrawal conduit 45 of the pressure vessel 34 is fluidically connected to the feed conduit 13 of the regeneration stage 19.

The treatment apparatus 43 is further connected to a recycling conduit 47 which is fluidically connected to the withdrawal conduit 43 of the pressure vessel and to the feed conduit 13 of the regeneration stage 19. Treated scrubbing medium 7 is supplied to the regeneration stage 11 by means thereof.

The waste air 49 formed during regeneration of the catalytically active component 17 inside the regeneration stage 11 is recycled into the compressor 21 of the gas turbine 23. To this end a waste air conduit 51, which is connected to a feed conduit 51 of the compressor 21, is connected to the regeneration stage 11 at the top 15 thereof. The waste air 49 is the waste air stream depleted of oxygen during the oxidation of the catalytically active component 17 which then passes through the burning process of the gas turbine 23.

The invention claimed is:

1. An apparatus for desulfurizing a hydrogen-sulfide-comprising gas stream, comprising:
    an absorber including a scrubbing medium comprising a catalytically active component, said absorber configured to absorb hydrogen sulfide from the gas stream to form elemental sulfur by the scrubbing medium comprising the catalytically active component,
    a regeneration stage configured to regenerate the catalytically active component reduced during sulfur formation which is fluidically connected to the absorber, and
    a gas turbine comprising a compressor, wherein the regeneration stage comprises an input air feed for feeding an oxygen-comprising gas from the compressor, wherein the input air feed is fluidically connected to a discharge conduit of the compressor of the gas turbine;
    wherein the absorber is further configured to form gas purified of hydrogen sulfide and wherein the gas turbine is fluidically connected to a discharge conduit of the absorber to supply the gas purified of hydrogen sulfide to the gas turbine.

2. The apparatus as claimed in claim 1, further comprising:
a metal salt which is employed as the catalytically active component.

3. The apparatus as claimed in claim 1,
wherein a ratio of an amount of oxygen supplied to the regeneration stage to an amount of catalytically active component is >1.

4. The apparatus as claimed in claim 1, further comprising a heat exchanger within the input air feed;
and wherein the heat exchanger within the input air feed is configured to cool the oxygen-comprising gas before entry into the regeneration stage.

5. The apparatus as claimed in claim 1, further comprising:
a waste air conduit which is fluidically connected to the compressor of the gas turbine and is connected to the regeneration stage, said waste air conduit configured to recycle waste air into the compressor that was formed during regeneration of the catalytically active component inside the regeneration stage.

6. The apparatus as claimed in claim 1, wherein the same gas turbine that feeds the oxygen-comprising gas from the compressor to the regeneration stage along the input air feed is supplied the gas purified of hydrogen sulfide from the discharge conduit of the absorber.

7. The apparatus as claimed in claim 1, further comprising:
a feed conduit for the scrubbing medium which is connected to a top of the regeneration stage.

8. The apparatus as claimed in claim 7,
wherein the input air feed is connected to a bottom of the regeneration stage such that the oxygen-comprising gas influxes through the regeneration stage in a flow direction counter to a flow direction of the scrubbing medium through the regeneration stage.

9. The apparatus as claimed in claim 1, further comprising:
a pressure vessel fluidically interposed between the absorber and regeneration stage, said pressure vessel configured to degas the scrubbing medium before the regeneration stage;
a separation unit configured to separate sulfur from the scrubbing medium; and
a withdrawal conduit that connects the pressure vessel and separation unit.

10. The apparatus as claimed in claim 9, further comprising a treatment apparatus configured to receive filtered scrubbing medium from the separation unit and a recycling conduit which is fluidically connected to the regeneration stage to supply treated scrubbing medium to the regeneration stage.

11. A method for desulfurizing a hydrogen-sulfide-comprising gas stream using the apparatus of claim 1, the method comprising:
contacting, in the absorber, the gas stream with the scrubbing medium comprising the catalytically active component to absorb the hydrogen sulfide and to form elemental sulfur,
supplying, through a discharge conduit, gas purified of hydrogen sulfide from the absorber to the gas turbine;
burning the gas purified of hydrogen sulfide in the gas turbine,
reducing, in the absorber, the catalytically active component during formation of the elemental sulfur,
supplying the scrubbing medium comprising the reduced catalytically active component from the absorber to the regeneration stage in which the reduced catalytically active component is reformed by oxidation with the oxygen-comprising gas supplied to the regeneration stage, and
supplying the oxygen-comprising gas to the regeneration stage from the compressor of the gas turbine.

12. The method as claimed in claim 11,
wherein the scrubbing medium is supplied to the regeneration stage at a top thereof.

13. The method as claimed in claim 11,
wherein the oxygen-comprising gas is supplied from the compressor to the regeneration stage at a bottom thereof.

14. The method as claimed in claim 11,
wherein a metal salt is employed as the catalytically active component.

15. The method as claimed in claim 11,
wherein an amount of the oxygen-comprising gas supplied to the regeneration stage is metered such that a ratio of a supplied amount of oxygen to an amount of the catalytically active component is >1.

16. The method as claimed in claim 11,
further comprising cooling the oxygen-comprising gas before entry into the regeneration stage.

17. The method as claimed in claim 11, wherein the contacting step further comprises forming gas purified of hydrogen sulfide.

18. The method as claimed in claim 11,
wherein waste air formed during reformation of the catalytically active component is recycled into the compressor of the gas turbine.

19. The method as claimed in claim 11,
wherein the regenerated scrubbing medium is withdrawn from the regeneration stage.

20. The method as claimed in claim 11,
wherein the regenerated scrubbing medium comprising the catalytically active component reformed by oxidation is passed from the regeneration stage into the absorber.

* * * * *